(12) United States Patent
Van Houten et al.

(10) Patent No.: US 11,400,752 B2
(45) Date of Patent: Aug. 2, 2022

(54) COMPOSITE WHEEL ASSEMBLY AND METHOD OF CONSTRUCTION THEREOF

(71) Applicant: Lacks Wheel Trim Systems, LLC, Kentwood, MI (US)

(72) Inventors: Garry Van Houten, Middleville, MI (US); Gerald Nuiver, Hudsonville, MI (US)

(73) Assignee: Lacks Wheel Trim Systems, LLC, Kentwood, MI (US)

( * ) Notice: Subject to any disclaimer, the term of this patent is extended or adjusted under 35 U.S.C. 154(b) by 559 days.

(21) Appl. No.: 16/210,672

(22) Filed: Dec. 5, 2018

(65) Prior Publication Data

US 2020/0180356 A1 Jun. 11, 2020

(51) Int. Cl.
| | |
|---|---|
| *B60B 7/06* | (2006.01) |
| *B60B 1/14* | (2006.01) |
| *B60B 7/00* | (2006.01) |
| *B60B 7/04* | (2006.01) |
| *B60B 3/04* | (2006.01) |
| *B60B 3/10* | (2006.01) |

(52) U.S. Cl.
CPC ............... *B60B 7/065* (2013.01); *B60B 1/14* (2013.01); *B60B 7/004* (2013.01); *B60B 7/0046* (2013.01); *B60B 7/0053* (2013.01); *B60B 7/04* (2013.01); *B60B 3/041* (2013.01); *B60B 3/10* (2013.01); *B60B 2310/302* (2013.01); *B60B 2310/318* (2013.01); *B60B 2360/104* (2013.01); *B60B 2360/34* (2013.01); *B60B 2360/366* (2013.01); *B60B 2900/311* (2013.01); *B60B 2900/572* (2013.01)

(58) Field of Classification Search
CPC ......... B60B 1/14; B60B 7/004; B60B 7/0046; B60B 7/0053; B60B 7/04; B60B 7/065; B60B 3/041; B60B 3/10; B60B 2310/302; B60B 2310/318; B60B 2360/104; B60B 2360/34; B60B 2900/572
See application file for complete search history.

(56) References Cited

U.S. PATENT DOCUMENTS

| | | | |
|---|---|---|---|
| 2,055,372 A * | 9/1936 | Zerk | B60B 1/10 301/37.29 |
| 4,316,637 A | 2/1982 | Reynolds et al. | |
| 5,636,906 A | 6/1997 | Chase | |
| 6,637,829 B1 * | 10/2003 | Jenkins | B60B 7/0053 301/37.108 |
| 7,621,048 B2 | 11/2009 | Coleman et al. | |
| 7,758,131 B1 | 7/2010 | Wolf et al. | |

(Continued)

*Primary Examiner* — Kip T Kotter
(74) *Attorney, Agent, or Firm* — Dickinson Wright PLLC (57) ABSTRACT

A composite wheel assembly and method of construction thereof is provided. The composite wheel assembly includes a lightweight annular aluminum barrel having an inner surface and an outer surface configured to support a tire thereon. A lightweight metal central hub assembly is fixed to the barrel. The metal central hub assembly includes a central hub portion and plurality of support spokes extending outwardly from the central hub portion to free ends, wherein the free ends are fixed to the inner surface of the aluminum barrel. A wheel cladding contrasting in at least one of material type, color, texture and surface finish to an outwardly facing surface the central hub assembly is fixed to the outwardly facing surface of the central hub assembly.

24 Claims, 7 Drawing Sheets

(56) References Cited

U.S. PATENT DOCUMENTS

| | | | |
|---|---|---|---|
| 8,020,945 B2 | 9/2011 | Takeda et al. | |
| 8,047,616 B2 | 11/2011 | Wolf et al. | |
| 8,162,406 B2 | 4/2012 | Heck et al. | |
| 8,418,735 B2 | 4/2013 | Kamiyama et al. | |
| 8,449,043 B2 * | 5/2013 | McCorry | B60B 7/061 301/37.106 |
| 8,465,106 B2 | 6/2013 | Yee et al. | |
| 8,740,315 B2 | 6/2014 | Goto | |
| 9,139,039 B2 | 9/2015 | Kozaki et al. | |
| 9,283,805 B2 | 3/2016 | Goto | |
| 9,415,628 B2 * | 8/2016 | Kia | B60B 7/01 |
| 9,493,031 B2 | 11/2016 | Dick et al. | |
| 9,724,962 B2 * | 8/2017 | Pieronek | B60B 7/18 |
| 9,789,729 B2 | 10/2017 | Anderson | |
| 10,363,775 B2 * | 7/2019 | Pieronek | B60B 3/12 |
| 2003/0080605 A1 * | 5/2003 | Coleman | B60B 3/005 301/63.103 |
| 2004/0021365 A1 * | 2/2004 | Georgeff | B60B 5/02 301/11.2 |
| 2004/0164606 A1 | 8/2004 | Chase et al. | |
| 2006/0261665 A1 * | 11/2006 | Gomora-Camargo | B60B 7/04 301/37.43 |
| 2008/0111419 A1 | 5/2008 | Stahel et al. | |
| 2010/0176650 A1 | 7/2010 | Zens et al. | |
| 2010/0181821 A1 | 7/2010 | Noriega | |
| 2010/0237685 A1 * | 9/2010 | Yee | B60B 7/18 156/123 |
| 2010/0320830 A1 * | 12/2010 | Rider | B60B 3/10 301/64.101 |
| 2013/0069422 A1 * | 3/2013 | Li | B60B 1/06 301/104 |
| 2013/0140874 A1 * | 6/2013 | Fukaya | B60B 3/10 301/63.103 |
| 2014/0265534 A1 * | 9/2014 | Chinavare | B60B 7/0066 301/37.102 |
| 2014/0265535 A1 * | 9/2014 | Stratton | B60B 3/10 301/37.102 |
| 2018/0022152 A1 | 1/2018 | Anderson | |

* cited by examiner

COMPOSITE WHEEL ASSEMBLY AND METHOD OF CONSTRUCTION THEREOF

FIELD OF THE DISCLOSURE

The present disclosure relates generally to automotive vehicles, and more particularly to a composite wheel assembly.

BACKGROUND OF THE DISCLOSURE

Vehicle wheel assemblies have taken on more geometric spoke shapes, multiple colors, and have been reduced in material thickness to enhance the driving performance and appearance of modern, high performance vehicles. It is known to provide wheel assemblies having steel rims including a steel central hub, a steel outer barrel, and steel spokes extending between the central hub and outer barrel. It is further known to incorporate plated surfaces or a metal plated cladding of thin plastic over outboard surfaces of the steel rims to enhance their aesthetic appearance. Although the appearance of the wheel assemblies is enhanced by these plating and cladded surfaces, the strength and bending stiffness of the wheel assemblies is generally unaffected by their presence. As such, the steel material that forms the central hub, outer barrel and spokes of the rim provides the entirety of the strength and bending resistance required for the vehicle. Although the steel rim can be formed to meet the strength and bending resistance requirements, it comes at a cost, including increased weight (static weight), increased Mass Moment of Inertia (MMOI), and increased rotating mass. By focusing on the individual functions of each portion of a wheel assembly, the portions can be optimized to provide a lighter static weight, a lower mass moment of inertial, while providing aesthetically attractive wheels. The use of lightweight rim and center spoke components fashioned from high strength forged heat treated materials is such an example.

SUMMARY OF THE DISCLOSURE

This section provides a general summary of the present disclosure and is not intended to be interpreted as a comprehensive disclosure of its full scope or all of its features, aspects and objectives.

It is an aspect of the present disclosure to provide a composite wheel assembly that addresses at least those issues discussed above with regard to known wheel assemblies.

In accordance with one aspect of the disclosure, a composite wheel assembly having a lightweight, aesthetically pleasing appearance that is economical to manufacture and exhibits a long and useful life is provided.

In accordance with another aspect of the disclosure, a composite wheel assembly is provided including a lightweight annular aluminum barrel having an inner surface and an outer surface configured to support a tire thereon, a lightweight metal central hub assembly including a central hub portion and plurality of support spokes extending outwardly from the central hub portion to free ends fixed to the inner surface of the aluminum barrel, and an aesthetically pleasing wheel cladding fixed to an outwardly facing surface of at least a portion of the central hub assembly.

In accordance with another aspect of the disclosure, the central hub assembly can be aluminum or an aluminum alloy.

In accordance with another aspect of the disclosure, the free ends of the support spokes can be shrink fit and welded to the inner surface of the aluminum barrel.

In accordance with another aspect of the disclosure, the wheel cladding can be permanently bonded to an outwardly facing surface of at least a portion of the central hub assembly.

In accordance with another aspect of the disclosure, the central hub assembly can be formed from one of forged aluminum, hydro-formed aluminum, and stamped aluminum.

In accordance with another aspect of the disclosure, the wheel cladding can be formed from one of a thermoplastic material, a thermosetting material, a carbon fiber material, a carbon fiber reinforced material, a fiberglass material, an aramid fiber reinforced material, a fiber reinforced thermoplastic material, a fiber reinforced thermoset material, and metal.

In accordance with another aspect of the disclosure, the wheel cladding can include at least one of an ultraviolet light protectant, a metallized treatment, a texturized treatment, a paint over-coating and painted portions.

In accordance with another aspect of the disclosure, the wheel cladding can include clad spokes configured in overlying relation with at least some of the support spokes.

In accordance with another aspect of the disclosure, the wheel cladding can have at least one of a color and surface finish that contrasts with a color and surface finish of at least one of the barrel and central hub assembly.

In accordance with another aspect of the disclosure, one or more voids can be provided between the clad spokes and the support spokes, wherein inserts can be disposed within the voids to eliminate mud and water entrapment to protect against wheel assembly imbalance.

In accordance with another aspect of the disclosure, the inserts can be formed of a light-weight foam material.

In accordance with another aspect of the disclosure, the inserts can be pre-formed of a foam material and subsequently permanently fixed within the voids via an adhesive.

In accordance with another aspect of the disclosure, a plurality of decorative members can be fixed to an outer surface of the wheel cladding.

In accordance with another aspect of the disclosure, the plurality of decorative members can be formed from one of a thermoplastic material, a thermosetting material, a carbon fiber material, a carbon fiber reinforced material, a fiberglass material, an aramid fiber reinforced material, a fiber reinforced thermoplastic material, a fiber reinforced thermoset material, and metal.

In accordance with another aspect of the disclosure, the wheel cladding can be bonded to the outwardly facing surface of the central hub assembly via at least one of urethane foam, a room temperature vulcanization silicone adhesive, or an alternate adhesive, such as epoxy or silicone-based hot melt adhesive.

In accordance with another aspect of the disclosure, the plurality of decorative members can be fixed to the outer surface of the wheel cladding via at least one of urethane foam, a room temperature vulcanization silicone adhesive, or an alternate adhesive, such as epoxy or silicone-based hot melt adhesive.

In accordance with yet another aspect of the present disclosure, a method of constructing a composite wheel assembly is provided. The method includes providing an annular aluminum barrel having an inner surface and an outer surface configured to support a tire thereon. Further, providing a metal central hub assembly including a central hub portion and plurality of support spokes extending outwardly from the central hub portion to free ends. Further, fixing the free ends of the support spokes to the inner surface of the aluminum barrel. Further yet, fixing a wheel cladding to an outwardly facing surface of at least a portion of the central hub assembly.

Another aspect of the method of construction can include providing the wheel cladding being formed of at least one of the following materials: carbon fiber, fiber-glass, molded thermoplastic or thermoset polymer, a metal, or any other non-standard plastic material.

Another aspect of the method of construction can include permanently bonding the wheel cladding to the metal central hub assembly via at least one of a urethane foam, a room temperature vulcanization silicone adhesive, or an alternate adhesive, such as epoxy or silicone-based hot melt adhesive.

Another aspect of the method of construction can include forming the metal central hub assembly via one of the following: forging aluminum, stamping aluminum, hydroforming aluminum, and machining aluminum.

Another aspect of the method of construction can include welding the free ends of the support spokes to the inner surface of the aluminum barrel.

Another aspect of the method of construction can include permanently bonding the wheel cladding to at least some of the support spokes.

Another aspect of the method of construction can include permanently bonding the wheel cladding to at least a portion of the central hub portion and to at least some of the support spokes.

Another aspect of the method of construction can include permanently bonding the wheel cladding to each of the support spokes.

Another aspect of the method of construction can include covering a substantial entirety of the outwardly facing surface of the metal central hub assembly with the wheel cladding.

Another aspect of the method of construction can include forming cavities between at least some of the support spokes and the wheel cladding and providing gap filling inserts in the cavities.

Another aspect of the method of construction can include pre-forming foam material to form the gap filling inserts and then subsequently disposing the pre-formed inserts in the cavities.

Another aspect of the method of construction can include bonding a plurality of decorative members on an outer surface of the wheel cladding.

Another aspect of the method of construction can include providing the wheel cladding having cladding spokes and permanently bonding the cladding spokes to at least some of the support spokes, and further including bonding at least some decorative members to at least some of the cladding spokes.

Another aspect of the method of construction can include providing recessed pockets in at least some of the cladding spokes and bonding decorative members in the recessed pockets.

These and other objects, aspects and areas of applicability will become apparent from the description provided herein. The description and specific examples in this summary are intended for purpose of illustration only and are not intended to limit the scope of the present disclosure.

BRIEF DESCRIPTION OF THE DRAWINGS

The drawings described herein are for illustrative purposes only of selected aspects and not all implementations, and are not intended to limit the present disclosure to only that actually shown. With this in mind, various objects, features and advantages of example aspects of the present disclosure will become readily apparent to one possessing ordinary skill in the art from the following written description and appended claims when considered in combination with the appended drawings, in which:

DETAILED DESCRIPTION OF THE DISCLOSURE

In the following description, details are set forth to provide an understanding of the present disclosure.

For clarity purposes, example aspects are discussed herein to convey the scope of the disclosure to those skilled in the relevant art. Numerous specific details are set forth such as examples of specific components, devices, and methods, in order to provide a thorough understanding of various aspects of the present disclosure. It will be apparent to those skilled in the art that specific details need not be discussed herein, such as well-known processes, well-known device structures, and well-known technologies, as they are already well understood by those skilled in the art, and that example embodiments may be embodied in many different forms and that neither should be construed to limit the scope of the disclosure.

The terminology used herein is for the purpose of describing particular example aspects only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or feature is referred to as being "on," "engaged to," "connected to," "coupled to" "operably connected to" or "in operable communication with" another element or feature, it may be directly on, engaged, connected or coupled to the other element or layer, or intervening elements or features may be present. In contrast, when an element is referred to as being "directly on," "directly engaged to," "directly connected to," or "directly coupled to" another element or feature, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly and expressly indicated by the context. Thus, a first element, component, region, layer or section discussed below could be termed a second element, component, region, layer or section without departing from the teachings of the example embodiments.

For purposes of description herein, the terms "upper," "lower," "right," "left," "rear," "front," "vertical," "horizontal," and derivatives thereof shall relate to the invention as oriented in the FIGS. However, it is to be understood that the present disclosure may assume various alternative orientations and step sequences, except where expressly specified to the contrary. It is also to be understood that the specific devices and processes illustrated in the attached drawings, and described in the following specification are exemplary aspects of the inventive concepts defined in the appended claims. Hence, specific dimensions and other physical characteristics relating to the aspects disclosed herein are not to be considered as limiting, unless the claims expressly state otherwise.

Figure 1:
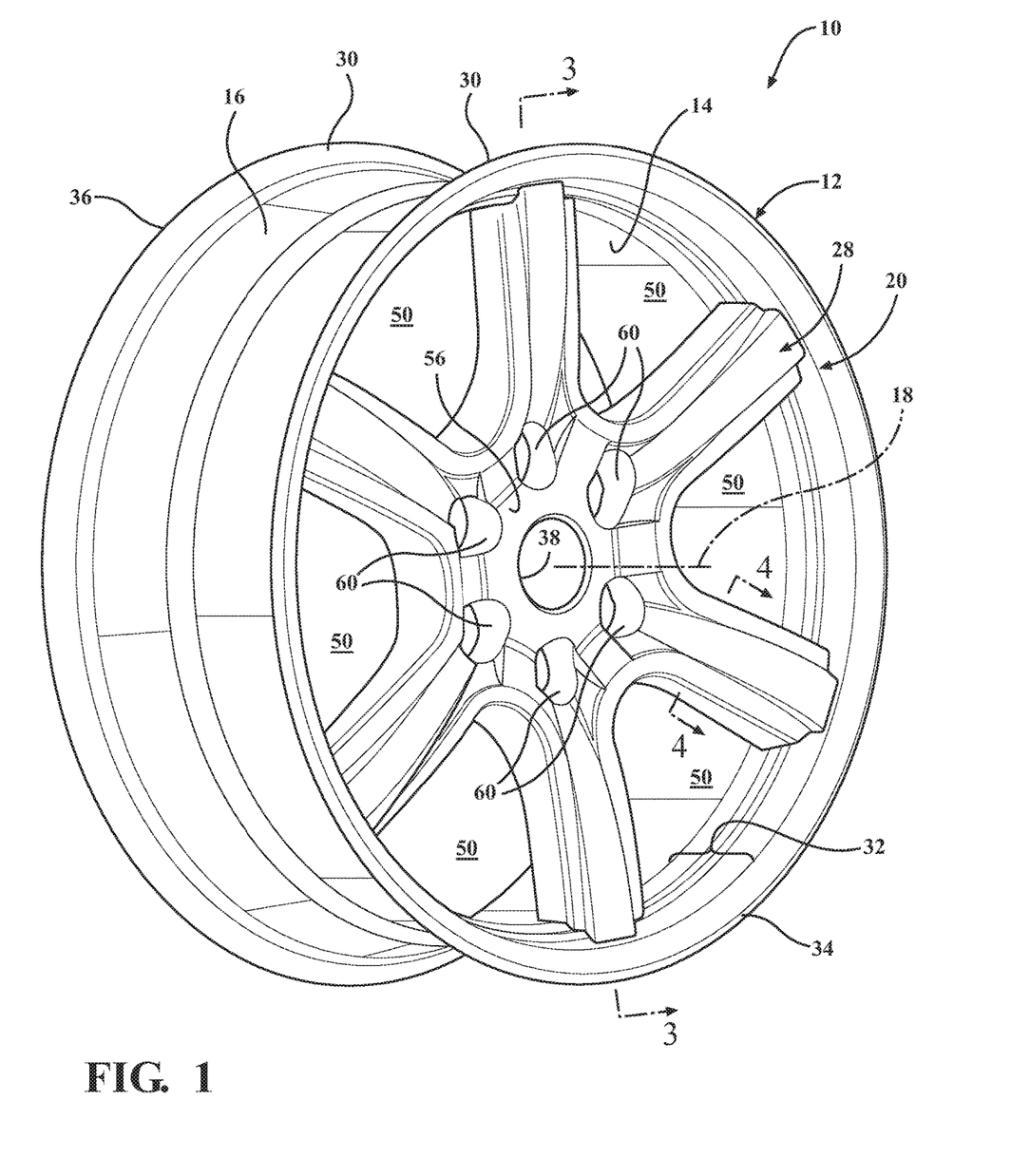
FIG. 1 is a perspective assembled view of a composite wheel assembly in accordance with an aspect of the disclosure.
Figure 2:
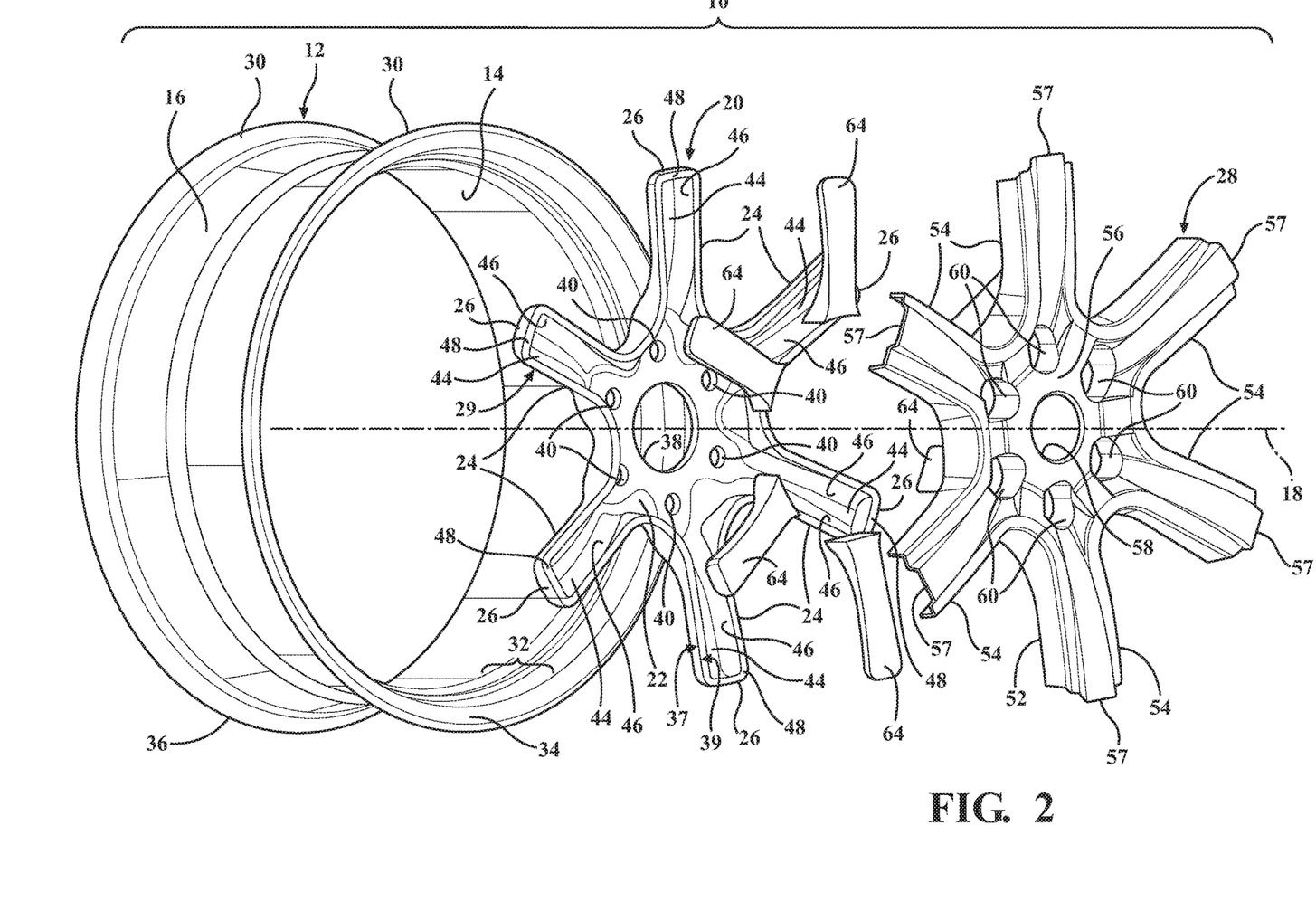
FIG. 2 is an exploded view of the wheel assembly of FIG. 1.
Figure 3:
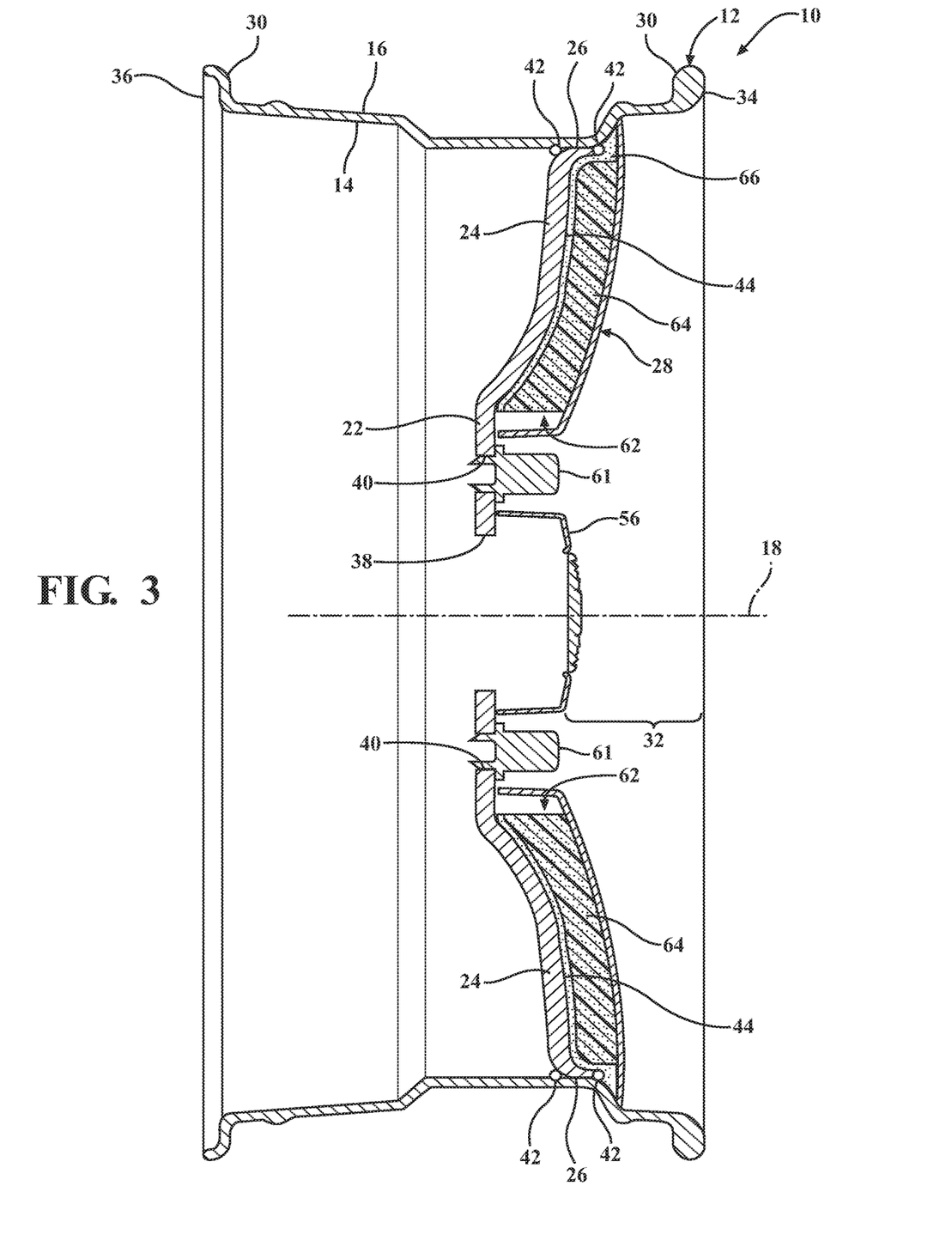
FIG. 3 is a cross-sectional view taken generally along the line 3-3 of FIG. 1.

Referring in more detail to the drawings, FIGS. 1-3 illustrate a composite wheel assembly 10 including a lightweight annular aluminum rim, also referred to as barrel 12, having a radially inwardly facing inner surface 14 and a radially outwardly facing outer surface 16 configured to support a tire (not shown) thereon for rotation about a central axis 18. The composite wheel assembly 10 further includes a high strength, lightweight metal central hub assembly 20 including a central hub portion 22 and plurality of structural spoke members, referred to hereafter as support spokes 24, extending radially outwardly from the central hub portion 22 and away from the central axis 18 to free ends 26. According to an aspect, free ends 26 can be fixed to the inner surface 14 of the aluminum barrel 12 that faces radially inwardly toward the central axis 18. The composite wheel assembly 10 may further include an aesthetically pleasing, decorative, lightweight, wheel cladding 28 fixed to an outwardly facing surface 29 (outwardly facing is intended to mean the surface 29 faces away from a brake side and away from an undercarriage of the vehicle) of at least a portion of the central hub assembly 20. With the barrel 12 being spun forged of aluminum, and the central hub assembly 20 being fabricated of a relatively lightweight, high strength metal, such as aluminum, by way of example and without limitation, and further with the wheel cladding 28 being lightweight, decorative and aesthetically pleasing, the composite wheel assembly 10 can ultimately be lightweight, extremely durable and visually pleasing, with the wheel cladding 28 being highly customizable in size, shape, color, texture, and features, as discussed further below, to provide the function and aesthetic appearance desired.

The barrel 12 can be formed of any suitable high strength, lightweight aluminum or aluminum alloy, with some presently preferred high strength, lightweight materials including 6061 aluminum alloy and 5454 aluminum alloy. It will be appreciated that a variety of other suitable materials may be employed. The barrel 12 is formed being generally cylindrical, having a generally cylindrical wall defined by the inner and outer surfaces 14, 16 which extend axially between radially outwardly extending rim beads 30 configured for sealed engagement with seal beads of the tire (not shown). The outer surface 16 is ultimately concealed from viewing by the tire, while at least a portion or a substantial entirety (substantial entirety is intended to mean that aside from those regions covered by the free ends 26 of the support spokes 24 and the central hub assembly 20, the remainder of the inner surface 14 can remain visible) of the inner surface 14, as desired, can remain visible, particularly an axially outermost, radially inner region 32 adjacent an environment side 34 opposite a brake side 36 of barrel 12.

The central hub assembly 20 can be fabricated of lightweight aluminum, such as being fabricated of one of forged aluminum, stamped aluminum, hydro-formed aluminum, and machined aluminum. It will be appreciated that a variety of suitable materials may be employed and which can be fabricated in a variety of suitable ways. Accordingly, it is to be recognized that the central hub portion 22 and the support spokes 24 may be constructed of a monolithic, single piece of material, having a continuous outer periphery 37 providing a portion of the outwardly facing surface 29, including an outwardly facing peripheral surface or rim 39. The central hub portion 22 can be formed having an opening, also referred to as hub aperture 38, extending therethrough along the central axis 18 about which the composite wheel assembly 10 rotates. The central hub portion 22 can further be formed having a plurality of fastener openings 40, with the fastener openings 40 being arranged in a predetermined pattern, such as along a circular arc having a radius centered at the central axis 18, with the fastener openings 40 being sized for close receipt of fasteners (not shown) therethrough on which lugnuts 61 (FIG. 3) can be threaded to facilitate fixation of the composite wheel assembly 10 to the desired vehicle platform. The free ends 26 of the support spokes 24 extend radially outwardly and may be configured in fixed attachment to the inner surface 14 of the barrel 12, such as via at least one or more weld joints 42 (FIG. 3). The support spokes 24 are shown having a recessed channel or trough-like shape, with a recessed wall 44 of the support spokes 24 being recessed toward the brake side of barrel 12 and sidewalls 46 of the support spokes extending from the recessed wall 44 toward the environment side 34 of barrel 12. They may take on a variety of other suitable configurations. To facilitate welding of the free ends 26 to the inner surface 14 of the barrel 12, an end wall 48 may extend from the recessed wall 44 toward the environment side 34 of barrel 12, wherein the end wall 48 defines the free end 26 having an increased exposed surface area for welded fixation to inner surface 14. A radially outwardly facing surface of the end wall 48 that defines the free end 26 can be machined or otherwise precisely contoured to provide an optimal fit and bond joint with the inner surface 14 of barrel 12, wherein the central hub assembly 20 can be shrink-fitted within inner surface 14 and subsequently welded and fixed thereto via one or more weld joints 42. The free ends 26 may be spaced circumferentially from one another in equidistant relation, with there being no connection between the free ends 26. As such, the portion of the inner region 32 of the barrel 12 can remain exposed for enhanced aesthetic appearance. As such, enclosed openings, commonly referred to as turbine openings 50, may be delimited by the support spokes 24 and the inner surface 14 of barrel 12.

The wheel cladding 28 may be formed, at least in part, of a high strength and/or high stiffness material, thereby functioning not only as an aesthetically pleasing decorative member, but also as a stiffening member to add strength and stiffness to the composite wheel assembly 10. Some of the high strength, high stiffness materials contemplated for the wheel cladding 28 include molded thermoplastic or thermoset polymer, carbon fiber or carbon fiber reinforced material, fiber-glass, aramid fiber reinforced material, fiber reinforced thermoplastic or thermoset polymer, or metal. Other suitable materials may be employed. An outer surface 52 of the wheel cladding 28, facing toward the environment side 34, can be painted, textured or otherwise finished to provide a particularly desired aesthetic appearance, such as a metal plated surface, by way of example and without limitation, and can further include an outer corrosion protectant paint. Accordingly, the outward appearance of the wheel cladding 28 can be easily and economically provided with a specialized, highly detailed decorative finish, and can be provided having any desired pattern or array of colors and textures desired, thereby providing enhanced color/gloss compliment or contrast, as desired, relative to the metal central hub portion and relative to the aluminum barrel 12.

Figure 4:
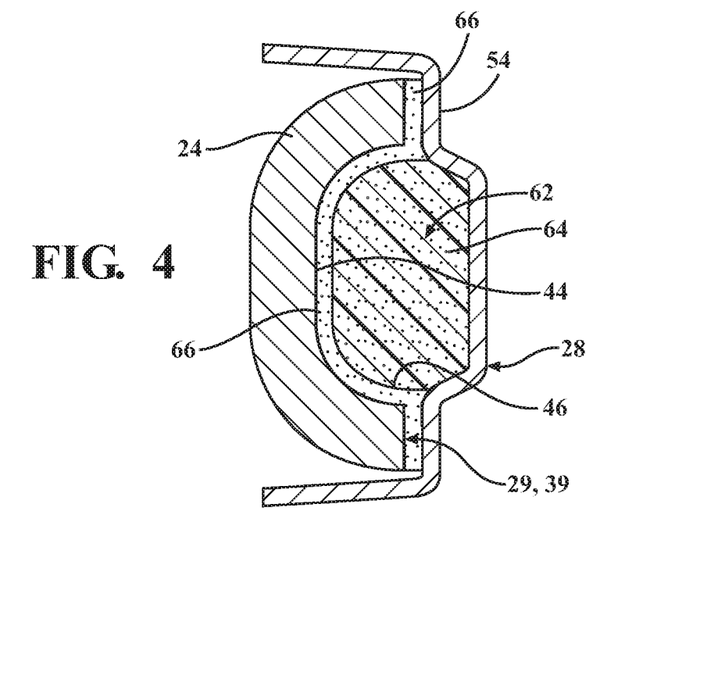
FIG. 4 is a cross-sectional view taken generally along the line 4-4 of FIG. 1.
Figure 5:
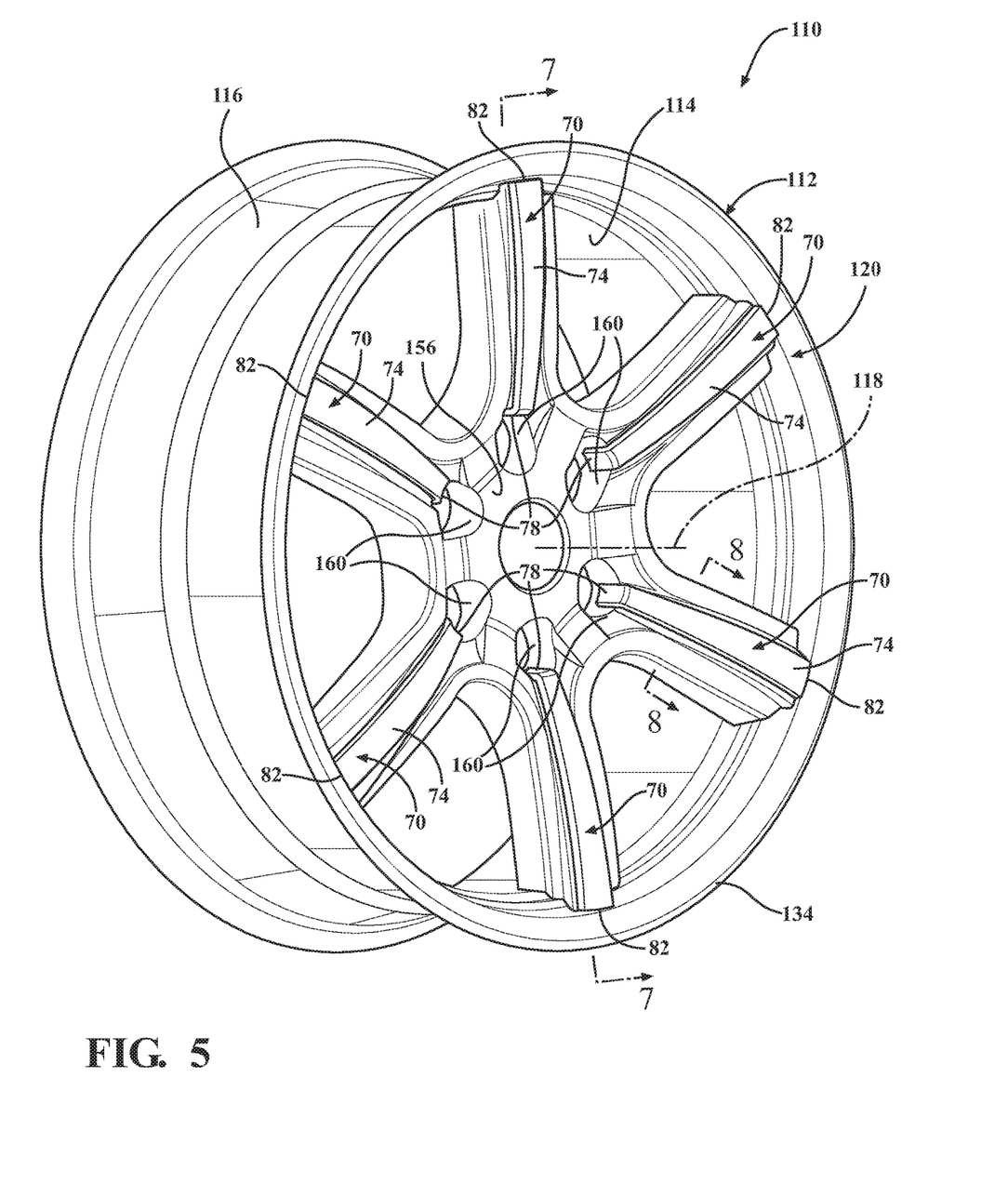
FIG. 5 is a perspective assembled view of a composite wheel assembly in accordance with another aspect of the disclosure.
Figure 6:
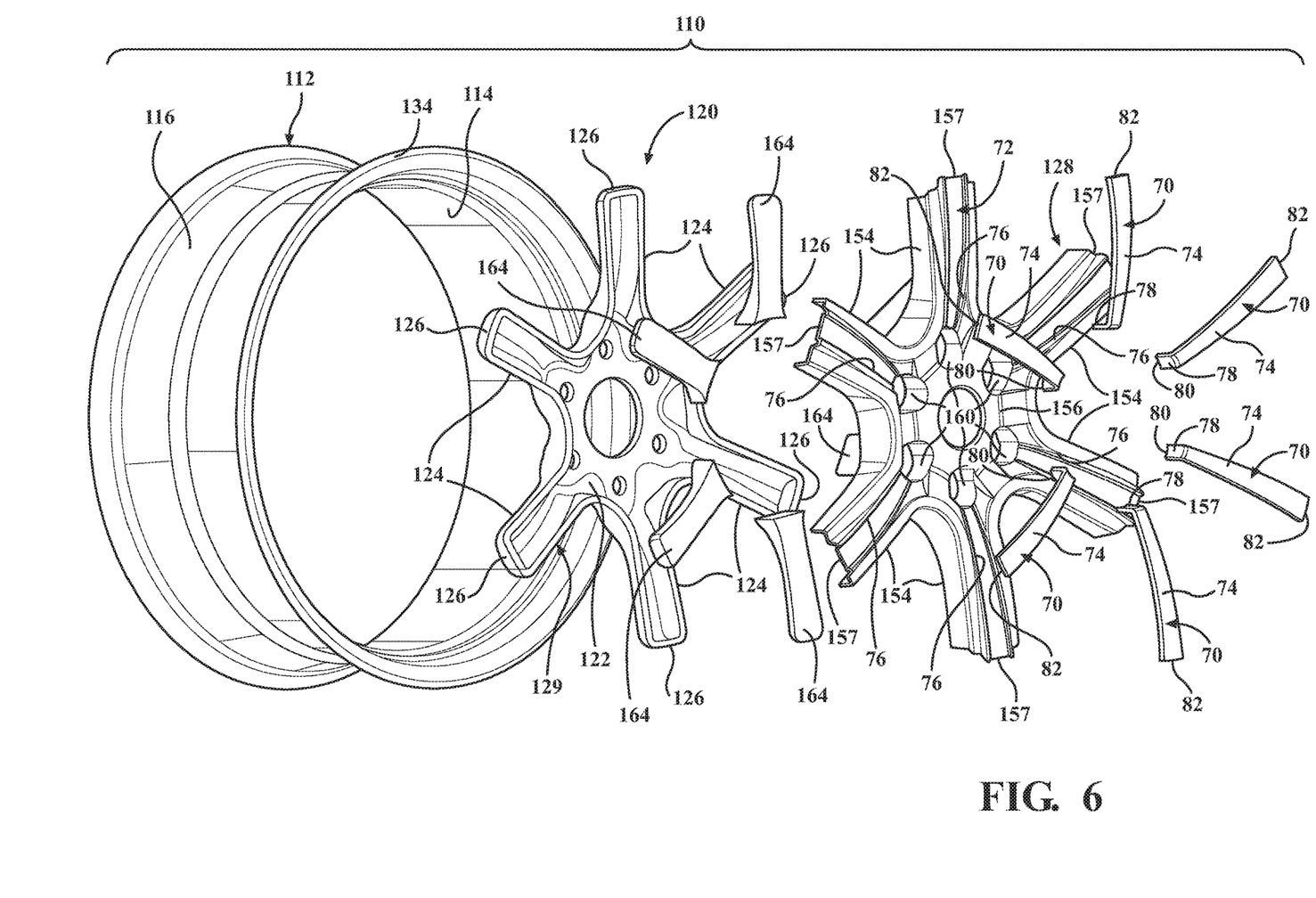
FIG. 6 is an exploded view of the wheel assembly of FIG. 5.
Figure 7:
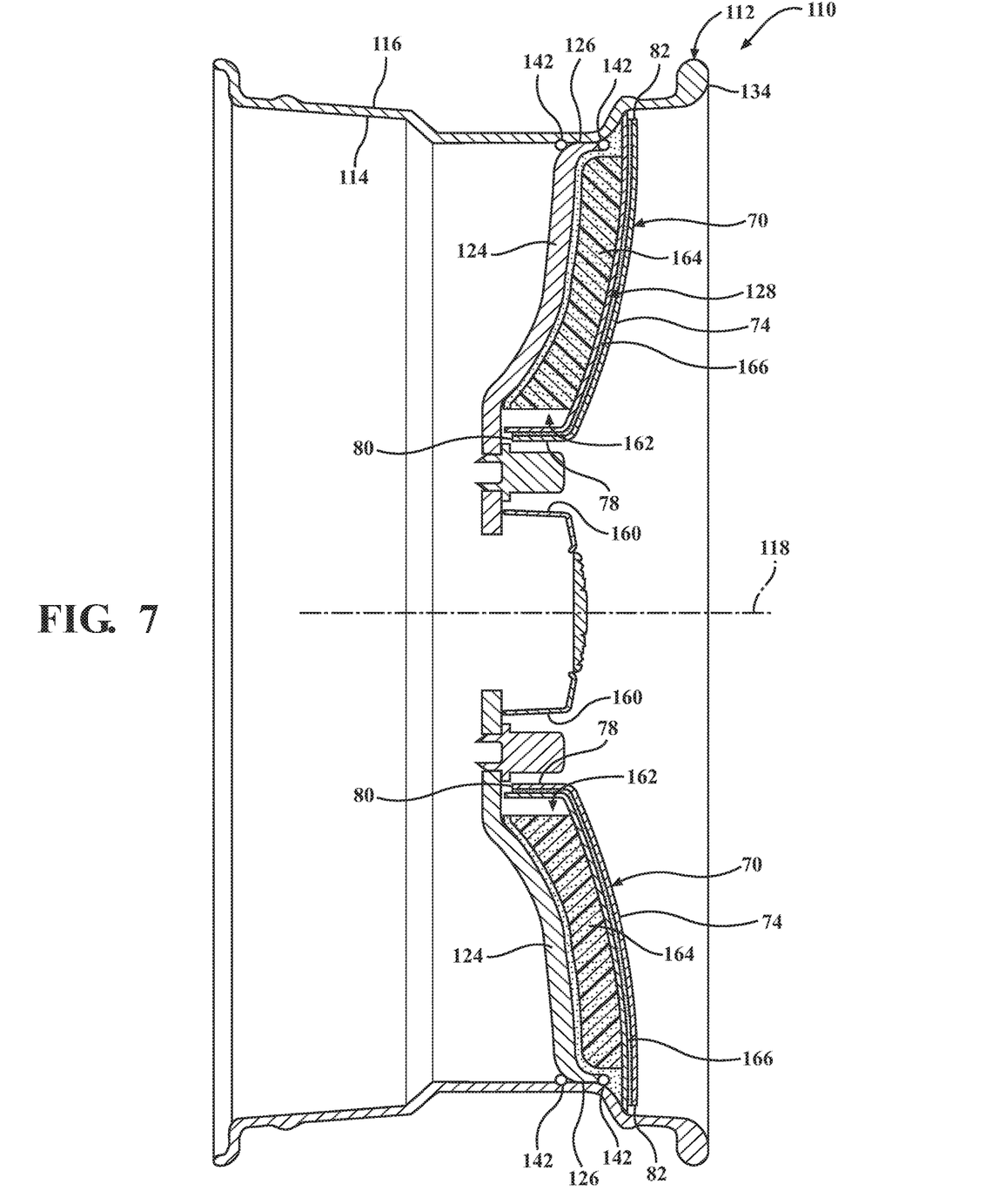
FIG. 7 is a cross-sectional view taken generally along the line 7-7 of FIG. 5.
Figure 8:
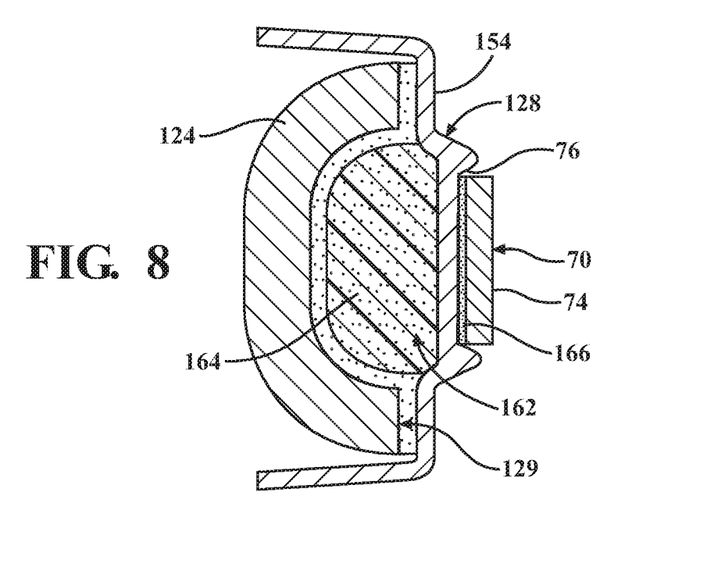
FIG. 8 is a cross-sectional view taken generally along the line 8-8 of FIG. 5.

The wheel cladding 28 can be formed having a geometry which substantially conforms to that of the outer periphery 37 of central hub assembly 20, namely, having an outer peripheral rim 52 which matingly fits within (inside), on top (in alignment), or as shown, about (outside), of the outer peripheral rim 39 of the wheel cladding assembly 20. The wheel cladding 28 is shown, by way of example and without limitation, having a plurality of cladding spokes 54 extending radially outward from a centrally-located hub region 56 to free ends 57, thereby not being connected to one another, as discussed above with regard to the support spokes 24. The wheel cladding is further shown as having a hub aperture 58 a plurality of lugnut receiving receptacles or apertures 60 configured for clearance receipt of the lugnuts 61, wherein the cladding spokes 54 generally correspond in size, shape and location to the plurality of support spokes 24. The hub aperture 58 aligns and registers with the hub aperture 20 in the central hub assembly 20 and the lugnut receiving apertures 60 align and register with the fastener openings 40 of the central hub assembly 20 when the wheel cladding 28 is fixedly attached to the central hub assembly 20. As a result, the wheel cladding 28 appears as an integral, aesthetically pleasing outwardly facing surface of the composite wheel assembly 10, shown as covering the entirety or substantial entirety (meaning slightly less than the entirety) of the central hub assembly 20, thereby covering the recessed wall 44 and side walls 46 of the support spokes 24, and thus, defining an enclosed void or cavity 62 (FIGS. 3 and 4) within each support spoke 24. It will also be appreciated that the cladding 28 can cover less than all of the central hub assembly (i.e. partial covering) to allow for further contrasting appearances.

The composite wheel assembly 10 can further include inserts 64, completely filling or substantially filling (meaning that a minimal air pocket may remain) the cavities 62. The dampening inserts 62 can be pre-formed and subsequently disposed as solid members within the troughs bounded by the recessed walls 44 and side walls 46. The inserts 64 may be formed of a light weight material. A supplemental bonding agent can be used to fix the inserts 64 against movement within the cavities 62, such as via an adhesive including one of room temperature vulcanization silicone adhesive (RTV), or an alternate adhesive, such as epoxy, silicone-based hot melt adhesive, or any other suitable adhesive.

In assembly, upon the inserts 64 being disposed in the troughs of the support spokes 24, the wheel cladding 28 can be bonded to the central hub assembly 20, and if desired to the inner surface 14 of the barrel 12 via continuous or segmented beads of a bonding adhesive(s) 66, which can also be used to fix the inserts 64 in place, if desired. Some exemplary aspects of a suitable adhesive 66 include a room temperature vulcanization silicone adhesive (RTV), or an alternate adhesive, such as epoxy, silicone-based hot melt adhesive, or any other suitable adhesive that would permanently fix the wheel cladding 28 to the central hub assembly 20 for the duration of the useful life of the vehicle. It is to be recognized that the selected adhesive can be placed on an inner surface of the wheel cladding 28 and/or on the outwardly facing surface of the central hub assembly 20, such as on the outwardly facing peripheral rim 39 (FIG. 4), by way of example and without limitation, as a continuous layer or in sections or patterns, as desired, and can further be disposed in the troughs to fix the inserts 64 in place. Once a bead of the adhesive is applied to at least one of the inwardly facing surface of the wheel cladding 28 and/or to the outwardly facing surface of the central hub assembly 20, the wheel cladding 28 is aligned with the central hub assembly 20, as desired, and the wheel cladding 28 is then pressed against the outwardly facing surface of the central hub assembly 20 for permanent fixation thereto.

In FIGS. 5-8, a composite wheel assembly 110 constructed in accordance with another aspect of the disclosure is shown, wherein the same reference numerals, offset by a factor of 100, are used to identify like features. The composite wheel assembly 110 includes the same features discussed above for composite wheel assembly 10, including a lightweight annular barrel 112, having radially inwardly facing inner surface 114 and a radially outwardly facing outer surface 116; a high strength, lightweight metal central hub assembly 120 including a central hub portion 122 and plurality of support spokes 124 extending radially outwardly from the central hub portion 122 to free ends 126 that are fixed to the inner surface 114 of the aluminum barrel 112, such as via a weld joint(s) 142; an aesthetically pleasing, decorative, lightweight, high strength wheel cladding 128 fixed to an outwardly facing surface 129 of at least a portion of the central hub assembly 120, with the cladding 128 having a plurality of cladding spokes 154 extending radially outward from a centrally-located hub region 156 to free ends 157; and inserts 164 completely filling or substantially filling cavities 162 formed between the support spokes 124 and the cladding spokes 154. Each of the above features of composite wheel assembly 110 may be the same or substantially the same as discussed above for composite wheel assembly 10, and thus, further description of details thereof is unnecessary, as one possessing ordinary skill in the art will readily appreciate the similarities.

In addition to the above features, composite wheel assembly 110 further includes a plurality of decorative members 70 fixed to an outer surface 72 of the wheel cladding 128. The decorative members 70 can be provided of a molded thermoplastic or thermoset polymer, carbon fiber or carbon fiber reinforced material, fiber-glass, aramid fiber reinforced material, fiber reinforced thermoplastic or thermoset polymer, or metal, e.g. aluminum or steel. An outer surface 74 of the decorative members 70, facing toward an environment side 134 and away from the wheel cladding 128, can be painted, textured or otherwise finished to provide a particularly desired aesthetic appearance, such as a metal plated surface, by way of example and without limitation, and can further include an outer ultraviolet light protectant. Accordingly, the outward appearance of the decorative members 70 can be easily and economically provided with a specialized, highly detailed decorative finish, and can be provided having any desired pattern or array of colors desired, whether the same or different from one another, thereby providing enhanced color compliment or contrast, as desired, relative to the metal central hub portion and relative to the aluminum barrel 12. The decorative members 70 can be fixed to the wheel cladding 128 via any suitable fixation mechanism, including, by way of example and without limitation, a suitable adhesive 166 including a room temperature vulcanization silicone adhesive (RTV), or an alternate adhesive, such as epoxy, silicone-based hot melt adhesive, or any other suitable adhesive that would permanently fix the decorative members 70 to the wheel cladding 128 for the duration of the useful life of the vehicle. It is to be recognized that the selected adhesive can be placed on an inner surface of the decorative members 70 and/or on the outwardly facing surface of the wheel cladding 128 as a continuous layer or in sections or patterns, as desired. To further facilitate locating the decorative members 70 in precise locations on the wheel cladding 128, and to provide further decorative aspects, the cladding spokes 154 can be formed having recessed pockets 76 sized for close receipt of the decorative members 70 therein. The recessed pockets 76 can be formed to extend along the entire length of the cladding spokes 154 or along a portion thereof, and shown in a non-limiting example as extending along a radially inward portion of the cladding spokes 154 immediately adjacent a central hub region 156 of the wheel cladding 128 and tapering off in a radially outward direction in an intermediate region of the cladding spokes 154. Accordingly, the recessed pockets 76 are shown extending along a radially inner region of the cladding spokes 154, but not along a radially outer region of the cladding spokes 154. As such, the decorative members 70 can be recessed or generally flush with the cladding spokes 154 along the radially inner region, while extending or protruding axially outwardly in raised fashion from the out surface 72 of the wheel cladding 128 along the radially outer region of the cladding spokes 154, thereby providing a dimensionally staggered, decorative appearance of the decorative members 70 relative to the cladding spokes 154. To further enhance the decorative appearance and to further facilitate assembly, a radially extending main body of the decorative members 70 can extend along the full length of the cladding spokes 154, with an axially inwardly extending finger 78 (extending in generally parallel relation to the direction of a central axis 118) extending to a radially inner free end 80, with the fingers 78 being configured to extend axially into a plurality of lug nut receptacles or apertures 160 in the wheel cladding 128, with a radially outer free end 82 being configured for close abutting receipt, by way of example and without limitation, with the inner surface 114 of the barrel 112. Accordingly, the decorative members 70 can be sized and shaped for a unidirectional, precise puzzle-like fit on the cladding spokes 154, thereby being assured of being uniformly and symmetrically positioned relative to one another.

In accordance with another aspect of the disclosure, a method of constructing a composite wheel assembly 10, 100 is provided. The method includes providing an annular aluminum barrel 12, 112 having an inner surface 14, 114 and an outer surface 16, 116 configured to support a tire thereon. Further, providing a metal central hub assembly 20, 120 including a central hub portion 22,122 and plurality of support spokes 24, 124 extending outwardly from the central hub portion 22,122 to free ends 26, 126. Further, fixing the free ends 26, 126 of the support spokes 24, 124 to the inner surface 14, 114 of the aluminum barrel 12, 112. Further yet, fixing a wheel cladding 28, 128 to an outwardly facing surface 29, 129 of at least a portion of the central hub assembly 20, 120.

Further aspects of the method of construction can include one or more of the following: providing the wheel cladding 28, 128 being formed of at least one of the following materials: carbon fiber, fiber-glass, molded thermoplastic or thermoset polymer, a metal, or any other non-standard plastic material; permanently bonding the wheel cladding 28, 128 to the metal central hub assembly 20, 120 via at least one of a room temperature vulcanization silicone adhesive, or an alternate adhesive, such as epoxy or silicone-based hot melt adhesive; forming the metal central hub assembly 20, 120 via one of the following: forging aluminum, stamping aluminum, hydro-forming aluminum, and machining aluminum; providing the wheel cladding 28, 128 having at least one of a color and surface finish that contrasts with a color and surface finish of at least one of the annular aluminum barrel 12, 112 and metal central hub assembly 20, 120; welding the free ends 26, 126 of the support spokes 24, 124 to the inner surface 14, 114 of the aluminum barrel 12, 112; permanently bonding the wheel cladding 28, 128 to at least some of the support spokes 24, 124; permanently bonding the wheel cladding 28, 128 to at least a portion of the central hub portion 22,122 and to at least some of the support spokes 24, 124; permanently bonding the wheel cladding 28, 128 to each of the support spokes 24, 124; covering a substantial entirety of the outwardly facing surface 29, 129 of the metal central hub assembly 20, 120 with the wheel cladding 28, 128; forming cavities 62, 162 between at least some of the support spokes 24, 124 and the wheel cladding 28, 128 and providing inserts 64, 164 in the cavities 62, 162; bonding a plurality of decorative members 70 on an outer surface 72 of the wheel cladding 28, 128; providing the wheel cladding 28, 128 having cladding spokes 54, 154 and permanently bonding the cladding spokes 54, 154 to at least some of the support spokes 24, 124, and further including bonding at least some decorative members 70 to at least some of the cladding spokes 154; and providing recessed pockets 76 in at least some of the cladding spokes 154 and bonding decorative members 70 in the recessed pockets 76.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of disclosure.

What is claimed is:

1. A composite wheel assembly, comprising:
   an annular barrel extending about a central axis about which said composite wheel assembly rotates, said annular barrel having a barrel inner surface facing said central axis and a barrel outer surface facing away from said central axis;
   a metal central hub assembly having a central hub portion with a through opening extending about said central axis and a plurality of support spokes extending radially outwardly from said central hub portion to free ends detached from one another, said free ends being attached to said barrel inner surface;

a wheel cladding fixedly bonded to at least a portion of an outwardly facing surface of said metal central hub assembly;

a plurality of decorative members bonded to an outer surface of said wheel cladding;

wherein said wheel cladding has cladding spokes fixed to at least some of said support spokes, and wherein at least some of said plurality of decorative members are bonded to said cladding spokes; and wherein at least some of said cladding spokes have recessed pockets extending radially outwardly from said central hub region and said at least some of said plurality of decorative members are bonded in said recessed pockets.

2. The composite wheel assembly of claim 1, wherein said metal central hub assembly is formed from one of forged aluminum, stamped aluminum, hydro-formed aluminum, and stamped aluminum.

3. The composite wheel assembly of claim 2, wherein the metal central hub assembly is formed from a 6061 or 5454 aluminum alloy.

4. The composite wheel assembly of claim 1, wherein said free ends of said support spokes are welded to said inner surface of said annular barrel.

5. The composite wheel assembly of claim 1, wherein said wheel cladding is permanently bonded to each of said support spokes.

6. The composite wheel assembly of claim 5, wherein said wheel cladding covers a substantial entirety of said outwardly facing surface of said metal central hub assembly, including a substantial entirely of said central hub portion.

7. The composite wheel assembly of claim 1, wherein cavities are formed extending axially between said support spokes and said wheel cladding such that said support spokes are spaced axially from said wheel cladding by said cavities.

8. The composite wheel assembly of claim 7, further including inserts contained within said cavities.

9. The composite wheel assembly of claim 8, wherein said inserts are formed of a light weight formed material.

10. The composite wheel assembly of claim 1 wherein the metal central hub assembly includes through holes for securing the composite wheel assembly to a vehicle.

11. The composite wheel assembly of claim 1, wherein said cladding spokes are permanently bonded to said at least some of said support spokes.

12. The composite wheel assembly of claim 11, wherein cavities are formed extending axially between said support spokes and said cladding spokes, and further including inserts formed of a light-weight formed material disclosed within said cavities.

13. The composite wheel assembly of claim 12, wherein the inserts are permanently bonded to the metal central hub assembly using an adhesive selected from at least one of the following: 1K RTV, 2K RTV, 1K hot melt, epoxy, and 2K urethane.

14. The composite wheel assembly of claim 1, wherein the wheel cladding is formed from a thermoplastic material, a thermosetting material, a carbon fiber or carbon fiber reinforced material, a fiber-glass material, a material reinforced with an aramid fiber, other fiber reinforced thermoplastic, thermosetting material, or formed metal.

15. The composite wheel assembly of claim 14, wherein the wheel cladding includes on the outwardly facing surface an ultraviolet light protectant, a metalizing treatment, texturing treatment, a paint over-coating, or selective paint coating.

16. The composite wheel assembly of claim 15, wherein a color of the outwardly facing surface of the wheel cladding is different than a color of the barrel inner surface of the annular aluminum barrel.

17. A composite wheel assembly, comprising:

an annular aluminum barrel extending about a central axis about which said composite wheel assembly rotates, said annular aluminum barrel having a barrel inner surface facing said central axis and a barrel outer surface facing away from said central axis;

a metal central hub assembly having a central hub portion with a through opening extending about said central axis and a plurality of support spokes extending radially outwardly from said central hub portion to free ends detached from one another, said free ends being attached to said barrel inner surface;

a wheel cladding fixedly bonded to at least a portion of an outwardly facing surface of said metal central hub assembly;

a plurality of decorative members bonded to an outer surface of said wheel cladding;

wherein said wheel cladding has cladding spokes permanently bonded to at least some of said support spokes, and wherein at least some of said plurality of decorative members are bonded to said cladding spokes; and wherein at least some of said cladding spokes have recessed pockets extending radially outwardly from said central hub region and said at least some of said plurality of decorative members are bonded in said recessed pockets.

18. A method of constructing a composite wheel assembly, comprising:

providing an annular barrel having an inner surface and an outer surface configured to support a tire thereon;

providing a metal central hub assembly including a central hub portion and plurality of support spokes extending outwardly from the central hub portion to free ends;

fixing the free ends of the support spokes to the inner surface of the annular barrel;

fixing a wheel cladding having a plurality of cladding spokes, with at least some of the cladding spokes having a recessed pocket extending radially outwardly from the central hub portion, to at least a portion of an outwardly facing surface of the metal central hub assembly; and bonding a plurality of decorative member to an outer surface of the wheel cladding, with at least some of the decorative members being bonded in at least some of the recessed pockets.

19. The method of claim 18, further including providing the wheel cladding being formed of one of a thermoplastic material, a thermosetting material, a carbon fiber material, a carbon fiber reinforced material, a fiberglass material, an aramid fiber reinforced material, a fiber reinforced thermoplastic material, a fiber reinforced thermoset material, and a metal.

20. The method of claim 19, further including providing the metal central hub assembly being formed via one of the following: forging aluminum, stamping aluminum, hydro-forming aluminum, and machining aluminum.

21. The method of claim 20, further including providing the wheel cladding having at least one of a color and surface finish that contrasts with a color and surface finish of at least one of the annular aluminum barrel and metal central hub assembly.

22. The method of claim 18, wherein the metal central hub assembly is formed from a forged aluminum, plate aluminum or cast aluminum.

23. The method of claim 18, wherein the outwardly facing surface of the wheel cladding includes a treatment selected from one or more of the following: an ultraviolet light protectant, a metalizing treatment, texturing treatment, a paint over-coating, or selective paint coating.

24. The method of claim 18, wherein an outwardly facing surface of the decorative members includes a treatment selected from one or more of the following: an ultraviolet light protectant, a metalizing treatment, a texturing treatment, a paint over-coating, or a selective paint treatment.

* * * * *